United States Patent [19]

Maciejko

[11] 4,360,372
[45] Nov. 23, 1982

[54] FIBER OPTIC ELEMENT FOR REDUCING SPECKLE NOISE

[75] Inventor: Roman Maciejko, Ottawa, Canada

[73] Assignee: Northern Telecom Limited, Montreal, Canada

[21] Appl. No.: 205,464

[22] Filed: Nov. 10, 1980

[51] Int. Cl.³ .................... C03B 23/207; G02B 5/16
[52] U.S. Cl. .................... 65/4.21; 350/96.24; 65/4.2
[58] Field of Search ............ 350/96.18, 96.20, 96.24, 350/96.25; 65/3.11, 4.2, 4.21

[56] References Cited

U.S. PATENT DOCUMENTS 3,624,816 11/1971 Strack et al. .................... 350/96.24
4,067,937 1/1978 Uno et al. .................... 350/96.18 X
4,186,994 2/1980 Denkin et al. .................... 350/96.2 X
4,243,398 1/1981 Nomura et al. .................... 65/4.2 X

FOREIGN PATENT DOCUMENTS 2023302 12/1979 United Kingdom ............ 350/96.25

*Primary Examiner*—Paul L. Gensler
*Attorney, Agent, or Firm*—Stuart L. Wilkinson

[57] ABSTRACT

A fiber optic system element for reducing speckle and modal noise resulting from coupling a laser diode to an optical fiber has the form of a short length of fiber through which extend filaments of different refractive indices. Such fiber is fabricated by fusing together a plurality of fibers of different refractive index profiles and drawing the resulting preform into a single fiber.

14 Claims, 3 Drawing Figures

FIBER OPTIC ELEMENT FOR REDUCING SPECKLE NOISE

This invention relates to a fiber optic system element for reducing speckle and modal noise.

Efficient coupling of laser light to optical fibers is an important consideration in fiber optic transmission systems. Lasers showing the desirable properties of good linearity, high quantum efficiency and output power generally have a narrow line width and very few longitudinal modes. In other words, they are highly coherent. Unfortunately, the coupling efficiency into multimode fiber can be quite markedly reduced by speckle noise which is a pronounced feature of highly coherent devices.

Speckle noise which is manifest as a pattern of light and dark patches obtained if laser light is projected on a surface occurs through constructive an distructive interference depending on the phase difference between rays incident at particular positions on the surface. Speckle noise gives rise to low frequency amplitude modulation at the receive end. This occurs in particular where the light encounters splices and connectors or if the fiber is distorted.

One way of reducing the coherence of a laser source is to randomize the phases of the emitted light rays by giving each a different optical path length. For maximum reduction in coherence, the number of optical paths should be as large as possible and with a great range of optical path lengths. An optical path length is dependent both on the geometric length and the refractive index of the medium encountered by the propagating ray. If all rays from the laser are directed through a fixed geometric length but through material having diverse refractive indices, their relative phases are scrambled. If this is done before the output is launched into an output optical fiber the deleterious effect of the speckle pattern will be reduced.

According to one aspect of the invention there is provided a fiber optic system element comprising a length of optical fiber having a plurality of filaments extending therethrough, the filaments fused together and having refractive indices different from one another whereby light propagating from one end of the body to a remote end thereof traverses an optical path different in length from an optical path traversed by light propagating along another filament.

Preferably, in order that the fiber has wave guiding properties, both the individual filaments and the resulting fiber can be surrounded by cladding of relatively low refractive index.

In a fiber optic system, one end of the element can be fused to an output fiber, and the element located so that light from a laser facet is launched into a free end of the element. Alternatively the element extends between a fiber pigtail having a predetermined numeral aperture, and an output fiber. The element can for example be fusion spliced to the pigtail and to the output fiber.

According to another aspect of the invention there is provided a method of fabricating a fiber optic system element for reducing speckle noise, the method comprising selecting a plurality of glass fibers having refractive index profiles different from one another, arranging the fibers in a bundle, heating the bundle of fibers to a fusion temperature to effect fusion of the fibers into a glass preform, heating the preform to a drawing temperature, and drawing a multi filament fiber from the preform, each filament corresponding to one of the original fibers.

Preferably the fibers are twisted before being fused into the preform. Fibers obtained by drawing down the preform can themselves be used in a subsequent interation of the method. An outer cladding tube of low index material can be fused onto the preform to make a composite preform immediately before drawing down the preform into the multi-filament fiber.

Embodiments of the invention will now be described by way of example with reference to the accompanying drawings in which.

Figure 1:
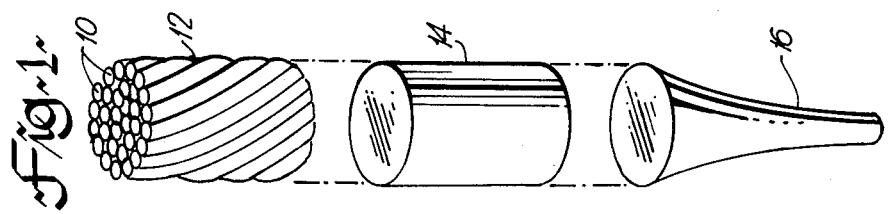
FIG. 1 shows stages in the fabrication of an element according to the invention.

Referring in detail to FIG. 1, several clad optical fibers 10 with refractive indices differing from one another are grounded into a bundle 12 and are heated to fuse the fibers 10 together. The fused bundle 14 produced is heated to a drawing temperature at which it is drawn down into a single fiber 16 of multi-filament character. The originating fibers 10 remain more-or-less as integral filaments within the fiber 16 but are obviously attenuated in diameter and extended in length. These filaments can be rendered narrower and more numerous by similarly bundling several of the multi-filament fibers 16 together, heating, fusing and pulling a second generation fiber from the preform. Indeed an iterative technique can be used to provide fiber with a large number of filaments of very small cross-sectional area.

The contrast between dark and light speckle spots is made smaller by superposition of many speckle patterns. Essentially the smaller diameter filaments act as secondary sources with consequent introduction of new mode arrangements and delays, light from the secondary sources giving a speckle pattern of reduced contrast.

Figure 2:
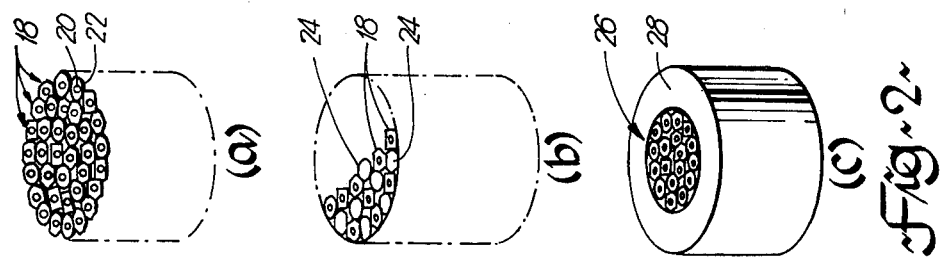
FIG. 2 shows schematically three types of fiber optic element according to the invention.

As shown in FIG. 2a the fiber element obtained has a plurality of filaments 18, each filament having a core 20 an cladding 22. The individual filaments 18, as well as having an optical path length dependent on the refractive index of its core, has a waveguiding character.

If a plurality of iterations of the method are used, the cladding tube of pure fused silica is fused to the outside of the final preform to give a low index outer cladding in the fiber eventually drawn in order that the fiber has a waveguiding character.

There is no stringent size limitation of the fibers 10 used to produce the fiber 16. As well as having different refractive indices, they may be of differing diameter.

Referring to FIG. 2b, some or all of the fibers used to fabricate the multi-filament fiber may be unclad. In this case, mode scrambling will occur before the output end of the element, the extent of scrambling depending on the ratio of clad 18 to unclad 24 filaments produced.

In an alternative structure shown in FIG. 2c the fiber produced has a core 26 of material similar to that illustrated in FIG. 2a or 2b, and has an external cladding 28 of pure fused silica. This fiber can be fabricated, for example, by placing a preform of fused fibers within a silica tube, heating the tube to fuse it onto the preform and then drawing down the composite preform produced.

Although as shown in FIG. 1, the bundle of fibers are given a pronounced lay direction before they are fused, the fibers may extend parallel to the longitudinal axis of the resulting preform although the former arrangement is preferred since it introduces more mode scrambling.

A short element 30 of the multi-filament, multiphase fiber 16 is then formed by scribing and breaking in a manner known in the optical fiber art.

Figure 3:
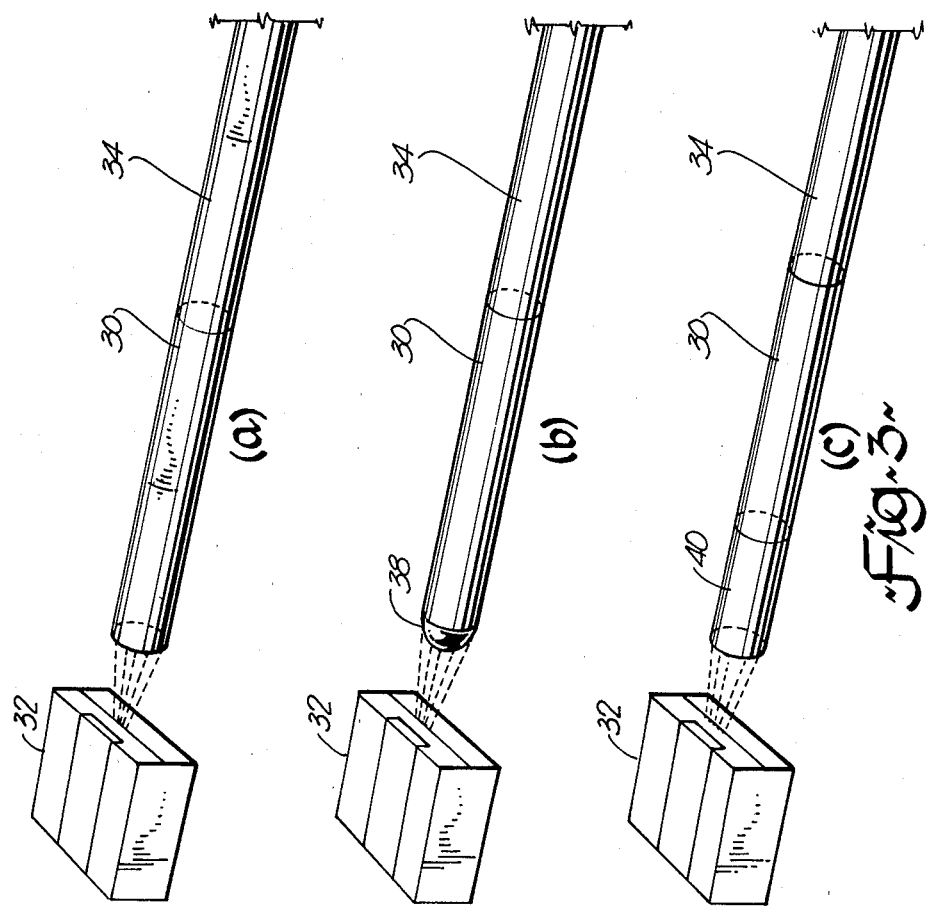
FIG. 3 shows three arrangements for incorporating an element into a fiber topic transmission system.

The element 30 of multiphase fiber is then incorporated into a fiber optic transmission system between a laser source 32 and an output optical fiber 34, typical arrangements being shown in FIG. 3. In FIG. 3a the multiphase fiber element 30 is directly coupled to the laser 32 by butting. In FIG. 3b coupling is through the agency of a lens 38 formed on one end of the element 30, for example, by dipping the end in a transparent epoxy and then curing the epoxy adhering to the element. Finally, an indirect coupling arrangement is illustrated in FIG. 3c in which the element 30 is inserted between the output fiber 34 and a short segment 40 of fiber having a predetermined numerical aperture. In each of the FIG. 3 arrangements, the multiphase fiber element 30 is joined to the output fiber 34 by a fusion splice.

Each of the multiphase elements 30 illustrated can have an anti-reflection coating (not shown) on an input end to reduce Fresnel reflection losses.

As mentioned previously, the multiphase elements 30 remove speckle noise caused by laser coherence, the effectiveness increasing with element length, up to a maximum tolerable length determined by insertion loss. The multiphase element also operates as a mode scrambler, mixing modes through adjacent filament crosstalk. This property can be adjusted by changing the ratio of clad to unclad fibers used in fabrication.

What is claimed is:

1. A fiber optic system element comprising a length of optical fiber having a plurality of filaments fused together, the filaments having refractive indices differing from one another to give a random refractive index profile distribution across the element, the element thereby characterized by a large number of possible optical path lengths for light propagating from one end of the element to a remote end thereof, each such path length depending upon the position of incidence of a light ray at said one end.

2. An element as claimed in claim 1, in which the filaments extend substantially parallel to one another from said one end of the element to the remote end.

3. An element as claimed in claim 1, in which some of the filaments have a core and a cladding, the core being of higher refractive index material than the cladding.

4. An element as claimed in claim 3, in which other of the filaments have no cladding.

5. An element as claimed in claim 1, the optical fiber having a cladding of relatively low refractive index material.

6. In a fiber optic transmission system, a coupling arrangement comprising a laser, and an element as claimed in claim 1, butt coupled to the laser, said element fusion spliced to an output fiber.

7. In a fiber optic transmission system, a coupling arrangement comprising a laser, a fiber input segment coupled to the laser, an output fiber, and an element as claimed in claim 1, fusion spliced between the input fiber segment and the output fiber.

8. In a fiber optic transmission system, a coupling arrangement for coupling laser light from a laser source to an output fiber, said coupling arrangement including an element as claimed in claim 1, one end of the element being formed with a lens for directing light from the laser into the element.

9. A method of fabricating the element of claim 1 comprising:
   selecting a plurality of glass fibers having refractive index profiles differing from one another;
   arranging the fibers in a bundle;
   heating the bundle of fibers to a fusion temperature and fusing the fibers together;
   heating the fused fibers to a drawing temperature; and
   drawing a multi-filament fiber from the fused fibers, each filament corresponding to one of the original fibers.

10. A method as claimed in claim 9 in which the bundle of original fibers is given a lay direction before the fibers are fused together.

11. A method as claimed in claim 9 in which several of the multi-filament fibers are arranged in a fiber bundle and the method of claim 10 is iterated.

12. A method as claimed in claim 9 in which, prior to fiber drawing, the preform is located within an annular jacket of pure fused silica, the jacket is fused down onto the preform to make composite preform, and the multi-filament fiber is drawn down from the composite preform.

13. A method as claimed in claim 9 in which some at least of the original glass fibers are clad.

14. A method as claimed in claim 9 in which the original fibers are of varied cross-sectional area.

* * * * *